(12) United States Patent
Longenecker et al.

(10) Patent No.: US 12,496,941 B1
(45) Date of Patent: Dec. 16, 2025

(54) KEYED RELEASE OF SECONDARY LOCKING MECHANISM

(71) Applicant: ARTSANA USA, INC., Lancaster, PA (US)

(72) Inventors: Michael L. Longenecker, Lancaster, PA (US); Michael S. Degrace, Red Lion, PA (US)

(73) Assignee: Artsana USA, Inc., Lancaster, PA (US)

( * ) Notice: Subject to any disclaimer, the term of this patent is extended or adjusted under 35 U.S.C. 154(b) by 170 days.

(21) Appl. No.: 18/507,830

(22) Filed: Nov. 13, 2023

Related U.S. Application Data

(60) Provisional application No. 63/425,337, filed on Nov. 15, 2022.

(51) Int. Cl.
 *B60N 2/28* (2006.01)

(52) U.S. Cl.
 CPC ......... *B60N 2/2806* (2013.01); *B60N 2/2821* (2013.01); *B60N 2/2869* (2013.01)

(58) Field of Classification Search
 CPC ... B60N 2/2821; B60N 2/2869; B60N 2/2806
 See application file for complete search history.

(56) References Cited

U.S. PATENT DOCUMENTS

| | | | |
|---|---|---|---|
| 2,093,861 A | 9/1937 | Bunevac | |
| 6,260,920 B1 * | 7/2001 | Tolfsen | B60N 2/143 |
| | | | 297/256.12 X |
| 6,431,647 B2 * | 8/2002 | Yamazaki | B60N 2/286 |
| | | | 297/256.12 X |
| 6,508,510 B2 * | 1/2003 | Yamazaki | B60N 2/286 |
| | | | 297/250.1 |
| 7,338,122 B2 | 3/2008 | Hei et al. | |
| 7,445,293 B2 | 11/2008 | Smith et al. | |
| 7,559,606 B2 * | 7/2009 | Hei | B60N 2/2887 |
| | | | 297/256.12 X |
| 7,575,276 B1 * | 8/2009 | Henry | B60N 2/2869 |
| | | | 297/256.12 X |
| 7,731,284 B2 | 6/2010 | Lhomme et al. | |
| 7,770,970 B2 * | 8/2010 | Hei | B60N 2/2869 |
| | | | 297/256.12 X |
| 8,235,465 B2 * | 8/2012 | Hei | B60N 2/2821 |
| | | | 297/256.12 X |
| 8,474,907 B2 | 7/2013 | Weber et al. | |
| 8,517,749 B2 | 8/2013 | Hei et al. | |
| 9,090,181 B2 | 7/2015 | Williams et al. | |
| 10,144,332 B2 | 12/2018 | Williams et al. | |
| 10,189,381 B2 * | 1/2019 | Williams | B60N 2/265 |
| 11,364,822 B1 * | 6/2022 | Rajasingham | B60N 2/885 |
| 11,565,612 B2 | 1/2023 | Williams | |

(Continued)

*Primary Examiner* — Rodney B White
(74) *Attorney, Agent, or Firm* — Saxton & Stump, LLC

(57) ABSTRACT

A child safety seat for use in a vehicle includes a base assembly securable to a seat in a vehicle, a seat shell connectable to the base assembly in a forward-facing configuration, a rearward-facing configuration, or moveable therebetween, a connector assembly having a latching mechanism operably configured to permit selective release of the connector assembly thereby enabling separation of the seat shell from the base assembly, and a secondary latching mechanism, the secondary latching mechanism configured to prevent operation of the latching mechanism in one or more predetermined operational configurations.

17 Claims, 13 Drawing Sheets

(56) References Cited

U.S. PATENT DOCUMENTS

| | | |
|---|---|---|
| 11,584,267 B2 * | 2/2023 | Longenecker ....... B60N 2/2821 |
| 12,233,759 B2 * | 2/2025 | Longenecker ....... B60N 2/2821 |
| 12,246,629 B2 * | 3/2025 | Frank ................... B60N 2/2824 |
| 2007/0284924 A1 | 12/2007 | Gold et al. |
| 2010/0032997 A1 | 2/2010 | Gold et al. |
| 2014/0062152 A1 | 3/2014 | Doolan et al. |
| 2016/0304004 A1 | 10/2016 | Sandbothe et al. |
| 2018/0264977 A1 * | 9/2018 | Anderson ............ B60N 2/2878 |
| 2024/0116412 A1 * | 4/2024 | Oltman ................ B60N 2/2806 |
| 2025/0178493 A1 * | 6/2025 | Frank ................... B60N 2/2824 |

* cited by examiner

KEYED RELEASE OF SECONDARY LOCKING MECHANISM

CROSS REFERENCE TO RELATED APPLICATIONS

This application claims priority benefit to provisional patent application 63/425,337 filed on Nov. 15, 2022, the entirety of which is incorporated by reference herein.

FIELD OF THE INVENTION

The present invention relates to child restraints adapted to be anchored to a vehicle seat to transport a child in the vehicle, and more particularly, to an interlocked release for a secondary latching mechanism that prevents unintentional separation of a seat shell and base assembly in a convertible or forward-facing child restraint system.

BACKGROUND OF THE INVENTION

Child restraint systems for use in vehicles (car seats) are well-known in the art. Car seats are removable units that may be selectively secured to a passenger seat of a vehicle by either lap and shoulder belts in the vehicle or specially configured connector belts. Car seats are specially designed for the smaller weight and size of a child, as compared to standard vehicle seats, which are designed to accommodate large youths and adults. Most states have statutes requiring that children below certain age and/or weight limits be positioned in a rear-facing seat. Once the child reaches a certain weight and age a front-facing car seat may be used.

Securing child restraint systems properly into vehicles requires users to adequately tension restraint belts, whether the vehicle's lap and shoulder belts or dedicated Lower Anchors and Tethers for Children (LATCH) belts. One method to assist users is a two-part child restraint system in which a base assembly is first secured to the vehicle and a seating assembly (shell) is subsequently attached by a connecting apparatus to the base assembly. Increased space is provided for users when the seat assembly is detached from the base assembly to enable users to more easily install the base assembly and properly tension the restraining belts.

Connecting apparatus are robustly designed maintain the seating assembly securely connected to the base assembly even when subjected to anticipated crash forces. The significance of the connecting apparatus in certification of the child restraint system requires that the joining portions of the apparatus be specifically designed to interface with one another. Consequently, seat shells and base assembly designs are often unique to specific models and interchangeability among seat shells and base assemblies is normally limited. Alternatively, car seats may be provided with features to prevent disassociating seat bases and shells to prevent consumers from attempting to install mis-matched safety seat components.

What is needed is a method to prevent unintentional separation of a seat shell of a convertible or forward-facing car seat from a base assembly that also allows a user to selectively separate the shell from the base assembly to improve access space for tensioning vehicle belts used to anchor the base assembly. Additional advantages would be realized by latching system for connecting a seat shell to a base assembly that minimize the risk of unintentional separation of the seat shell and base assembly. Still more advantages would be realized by a latching system that includes an interlock device configured to limit release of the interlock device, and therefore the latching mechanism, to a predefined condition. Even more advantages would be realized by a latching mechanism with an interlock device that automatically resets to a lock condition when the seat shell and base assembly are re-joined. Other features and advantages will be made apparent from the present specification. The teachings disclosed extend to those embodiments that fall within the scope of the claims, regardless of whether they accomplish one or more of the aforementioned needs.

SUMMARY OF THE INVENTION

Accordingly, the present invention, in any of the embodiments described herein, may provide one or more of the following advantages:

It is an object of the present invention to provide a child safety seat for use in a vehicle having a base assembly securable to a seat in the vehicle, a seat shell connectable to the base assembly, a connector assembly having a latching mechanism operably configured to permit selective release of the connector assembly thereby enabling detachment of the seat shell from the base assembly, and a secondary latch interlock configured to permit operation of the latching mechanism only in one predetermined operational configuration of the secondary latching mechanism. The secondary latch interlock is operable by an actuator, the use of the actuator being required to operate the latch interlock.

It is a further object of the present invention to provide a child safety seat for use in a vehicle having a base assembly that is removably securable in a vehicle and a seat shell connected to the base assembly by a connector assembly. The connector assembly enables the seat shell to be selectively detached from the base assembly and to be swiveled about a generally upstanding axis and locked into forward-facing or rearward-facing positions for use. The seat shell may also be swiveled to side-facing positions to improve access to the child when placing or removing the child from the safety seat. A latching mechanism is provided to maintain the seat shell-to-base assembly connection and includes a releasing mechanism to allow a user to selectively detach the shell from the base assembly.

It is a further object of the present invention to provide a child safety seat for use in a vehicle having a base assembly that is removably securable in a vehicle and a seat shell selectively detachable from the base assembly. A release mechanism selectively operable by a user allows, when operated, the seat shell to be detached and separated from the base assembly. An actuator comprising a key or tool interfaces with the release mechanism to enable operation thereof. The release mechanism remains inoperable in the absence of the actuator to provide a redundant means to prevent unintentional release and separation of the seat shell from the base assembly.

It is a still further object of the present invention to provide a convertible child safety seat for use in a vehicle having a base assembly securable to a seat in a vehicle, a seat shell connectable to the base assembly, and a release mechanism enabling selective separation of the shell from the base assembly featuring key or tool-operated secondary release which prevents accidental or unintentional operation of the release mechanism that is durable in construction, inexpensive of manufacture, carefree of maintenance, easily assembled, and simple and effective to use.

These and other objects are achieved in accordance with the present invention by providing a child safety seat for use in a vehicle includes a base assembly securable to a seat in a vehicle, the base assembly being anchorable in the vehicle using either conventional safety belts or LATCH anchoring provisions, a seat shell connectable to the base assembly in a forward-facing configuration, a rearward-facing configuration, or moveable therebetween. A release mechanism easily operable by a user allows, when operated, the seat shell to be detached from the base assembly. A secondary locking device, operated by a key or tool, is provided on the release mechanism to provide an additional means to prevent unintentional release and separation of the seat shell from the base assembly.

BRIEF DESCRIPTION OF DRAWINGS

Other features and advantages of the present invention will be apparent from the following more detailed description of the preferred embodiment, taken in conjunction with the accompanying drawings which illustrate, by way of example, the principles of the invention.

Wherever possible, the same reference numbers will be used throughout the drawings to represent the same parts.

DETAILED DESCRIPTION OF THE INVENTION

Figure 1:
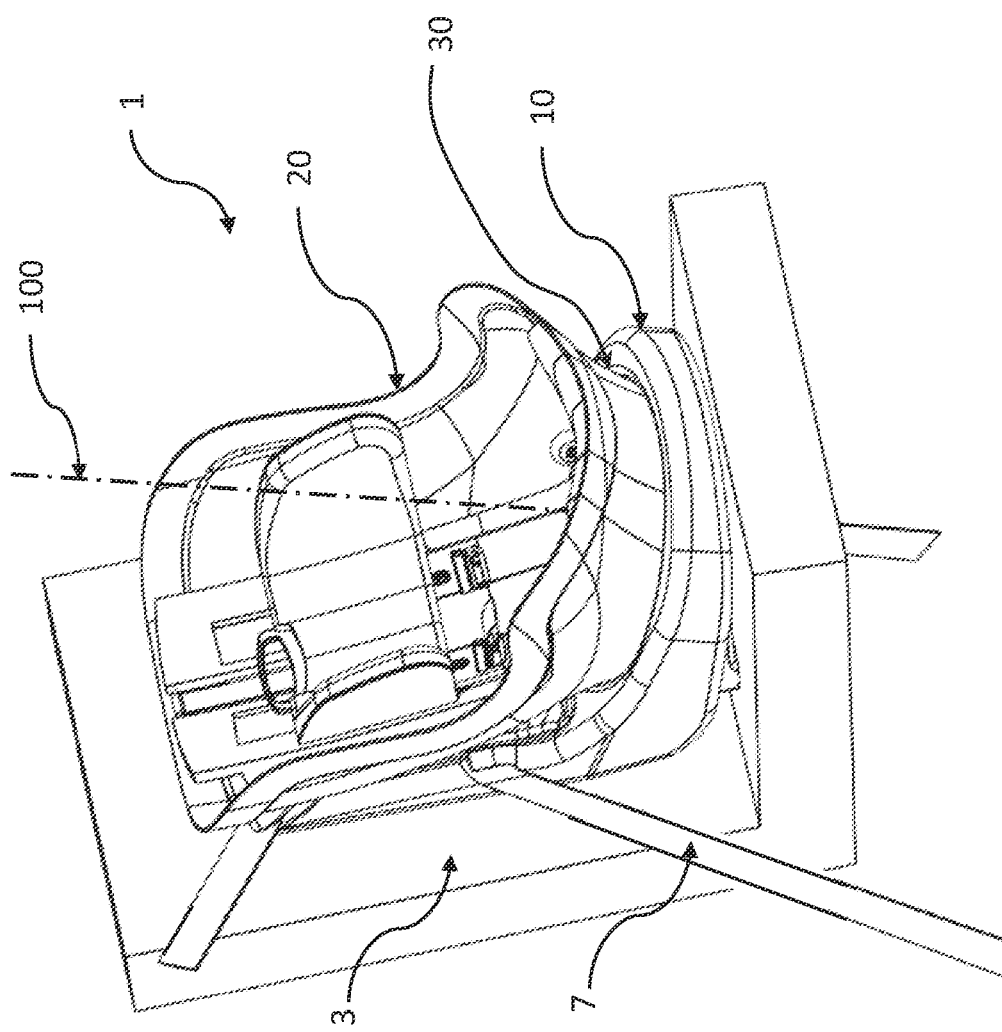
FIG. 1 is a perspective view of a child safety seat illustrating an embodiment of the present invention positioned for use in a vehicle.
Figure 2:
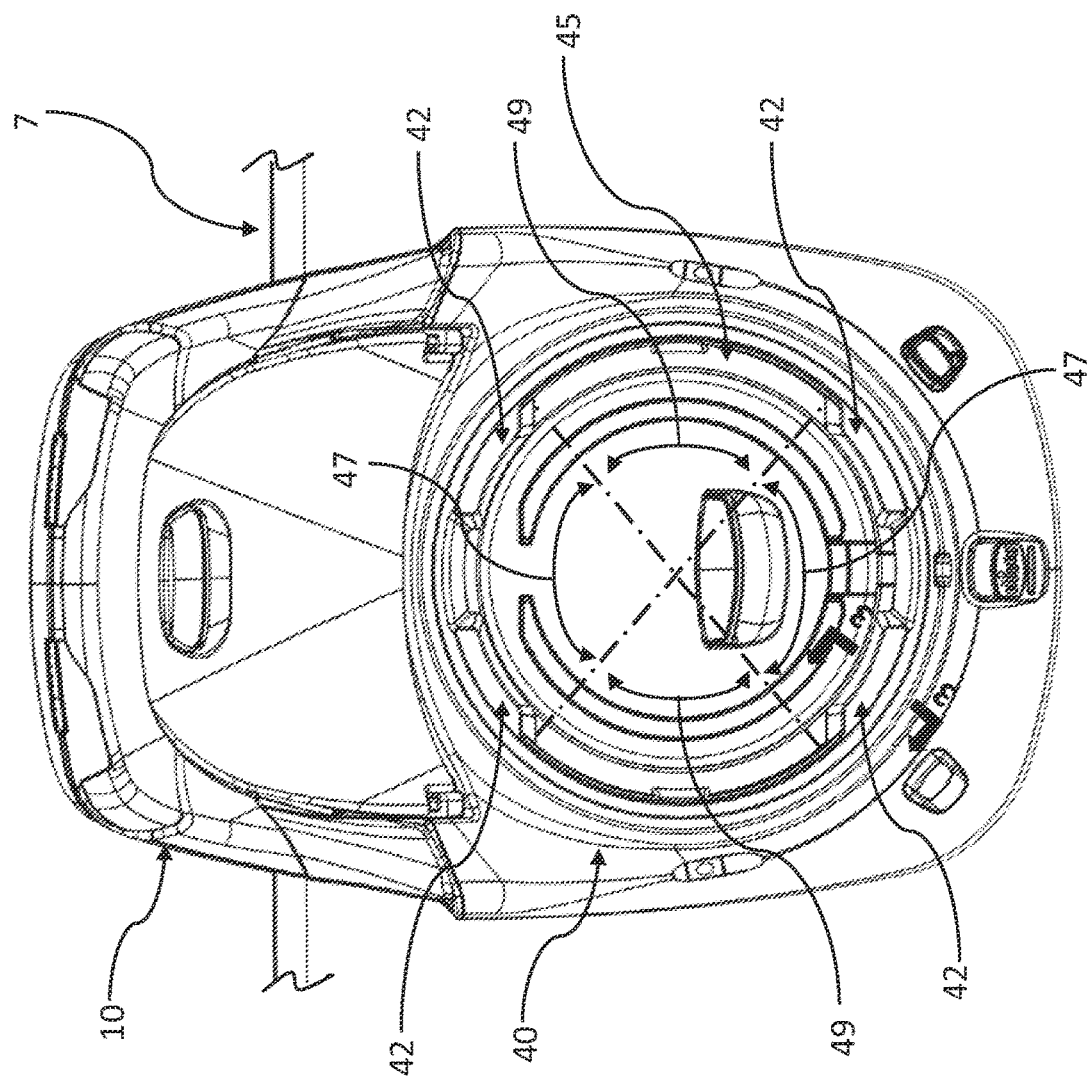
FIG. 2 is a partial plan view of a base assembly used in an embodiment of the present invention.
Figure 3:
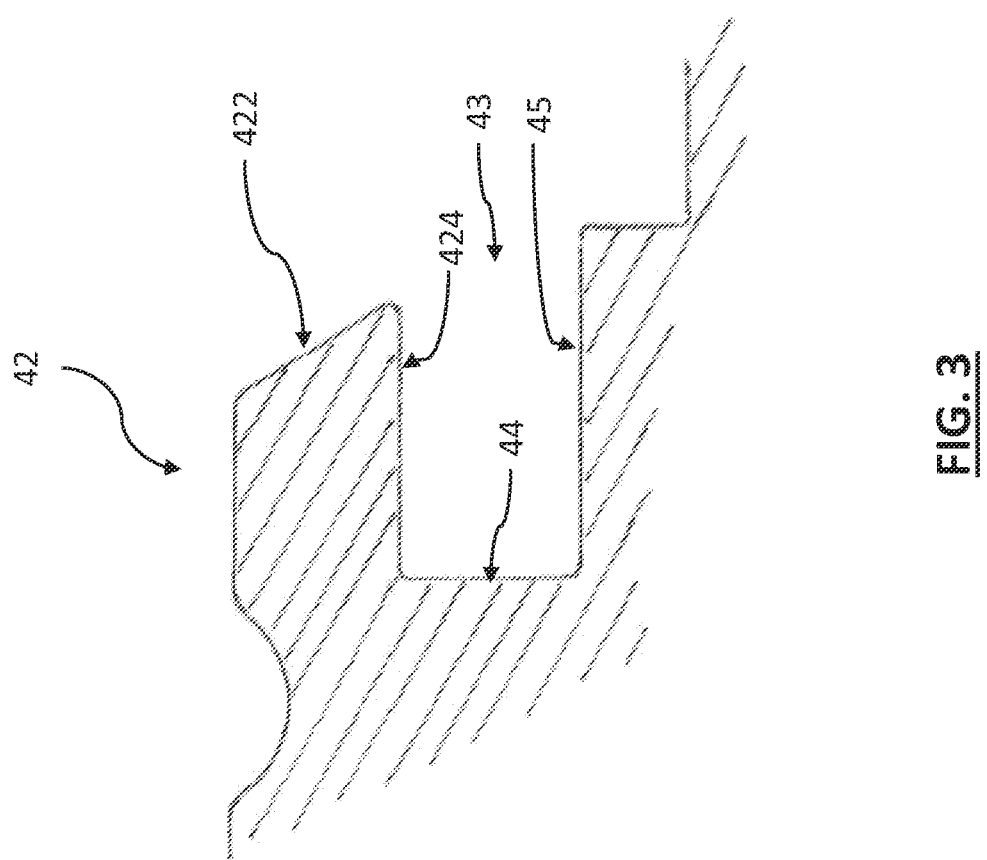
FIG. 3. is a section view of a portion of the base assembly connector interface shown in FIG. 2 viewed along cut line 3-3.
Figure 4:
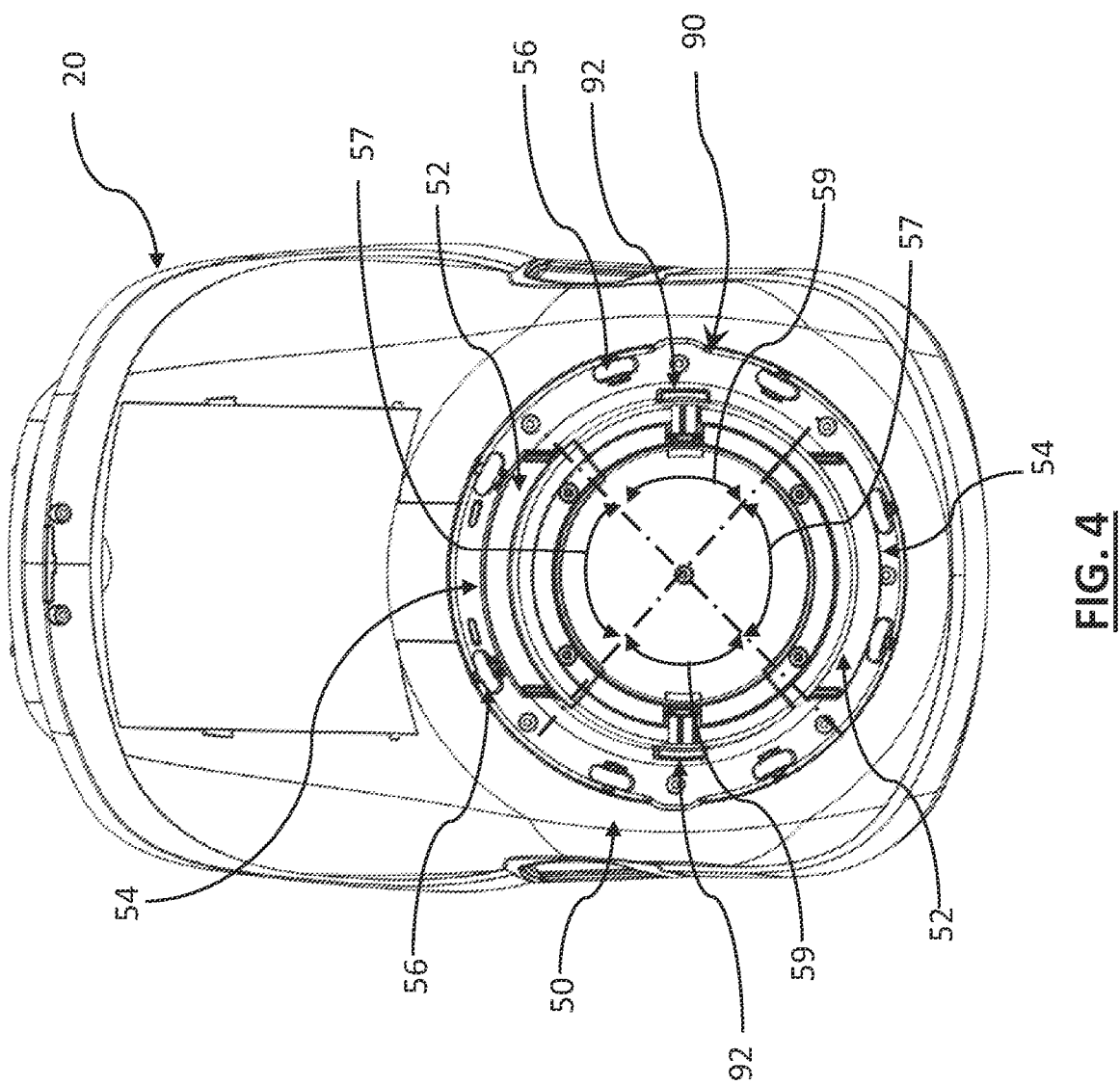
FIG. 4 is a bottom view of the lower surface of a seat shell showing the seat portion of the connector interface.
Figure 5:
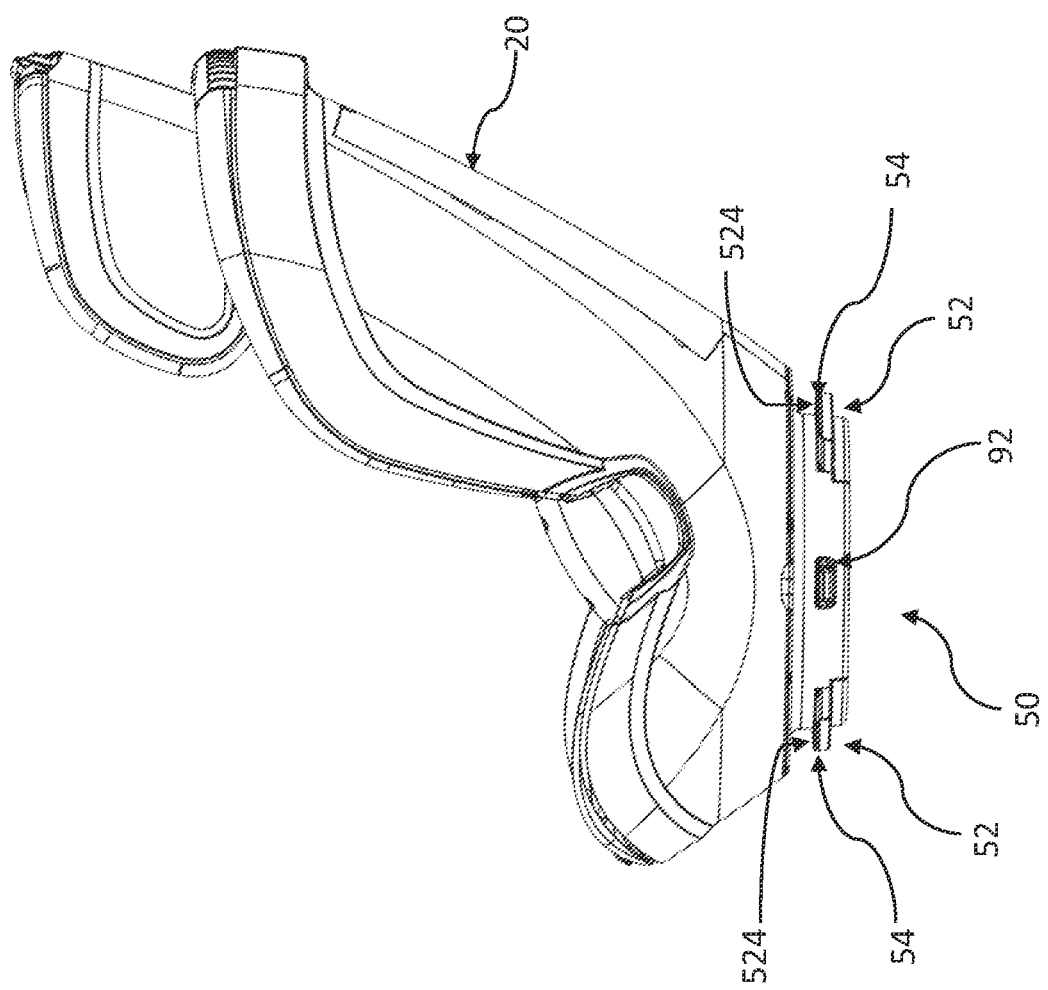
FIG. 5 is a side elevation view of the seat shell showing the configuration of the connector interface.
Figure 6:
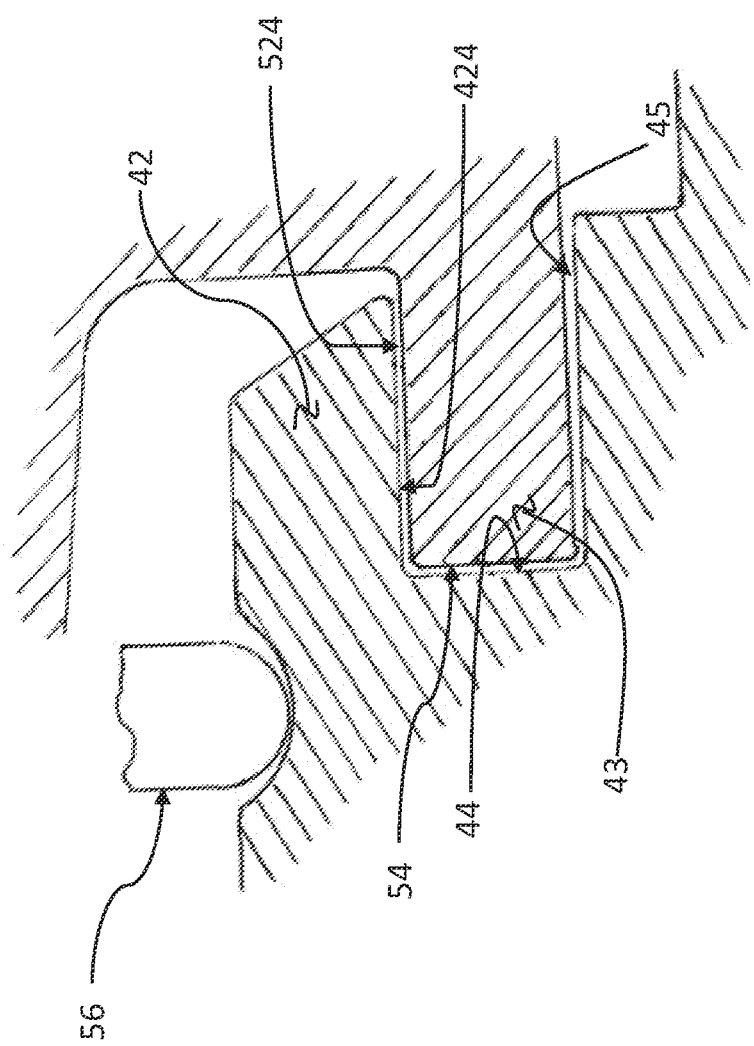
FIG. 6 is a partial section view of FIG. 5 showing a portion of the second retainer to illustrate the spatial relationship of the retainers in the connector interface when the seat shell is installed.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "up" or "down," or "top" or "bottom" are used as a matter of mere convenience and are determined as the seat would normally be positioned on a surface or vehicle seat. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

Exemplar child safety seats featuring release mechanisms for selectively separating the seat shell from the seat base assembly for which the present invention is useful is disclosed in in U.S. Pat. No. 11,584,267, for "Rotatable Car Seat with Detachable Seat and Top Anchor," by Longenecker, et al., and U.S. patent application Ser. No. 17/954,637, for "Rotatable Car Seat with Detachable Seat and Top Anchor," by Longenecker, et al., the descriptions portions of which are incorporated herein by reference.

Referring to the figures, a child safety seat 1 embodying the present invention comprises a base assembly 10, a seat shell 20, and a connector assembly 30 for detachably coupling the seat shell to the base assembly. The base assembly is configured to be positioned and secured on the seating surface of a vehicle seat 3 using a seat belt 7 or the like typically present in the vehicle. Seat shell 20 is configured to accept an infant or child occupant and safely restrain the occupant during travel in the vehicle.

In a first aspect of the invention, the seat connector assembly 30 includes a first connector portion 40 disposed on the base assembly and a second connector portion 50 disposed on an exterior surface of the seat shell. The seat connector assembly 30 allows the seat shell to be selectively separated from the base assembly to improve user access to the base assembly when installing it into a vehicle. The seat connector assembly portions 40, 50 may also be configured to couple the seat shell to the base assembly in a manner allowing the seat shell to swivel 360 degrees about a generally upstanding rotational axis 100 while coupled.

The first connector portion 40 may comprise a pair of base retainers 42 and an outer lateral guide 44 symmetrically arranged about the rotational axis 100. The outer lateral guide 44 is defined by an upstanding wall circularly arranged and upwardly projecting from a floor surface 45 of the base assembly. The base retainers 42 project inwardly from the outer lateral guide 44 encircling an upwardly open area for receiving a second interface portion 50 of the connector assembly. The base retainers 42 include a base vertical bearing surface 424 which is generally parallel to and spaced apart from the floor surface 45 forming a generally C-shaped, inwardly open base channel 43 therebetween that extends partially around the periphery of the outer lateral guide 44. The base retainers 42 may also include an inwardly sloped upward facing surface 422 to aid guidance of the seat shell into the connector assembly 30. The base retainers 42 may be symmetrically arranged arcuately about a portion of the base lateral guide surface 44. In the preferred exemplar embodiment, two base retainers 42 are provided and symmetrically positioned about the circular perimeter, each spanning a base retainer sector 47. A pair of base gap sectors 49 is defined along the circular perimeter of the lateral guide between the base retainers 42. The base retainers do not inwardly extend in the region of the gap sectors and define gaps in the base retainers. The arcuate measure of the gap sectors preferably exceeds the arcuate measure of the base retainers.

Connector assembly 30 also comprises a generally circular seat connector portion 50 disposed on the lower exterior surface of the seat shell 20. The seat connector portion 50 is symmetrically arranged about the rotational axis 100. The diameter of the seat connector portion 50 is sized to enable it to nest within open receiving area of the base connector portion 40. The seat connector portion 50 includes a pair of seat retainers 52 that extend radially outwardly from a central portion of the seat connector portion structure. Each of the seat retainers 52 include a seat lateral guide 54 and a seat vertical bearing surface 524. Seat retainers are symmetrically arranged about a portion of the periphery of the seat connector 50, the seat lateral guides 54 defining a circular perimeter having a diameter that is slightly less than that of the base lateral guide 44. When the seat shell 20 is engaged with the base assembly 10, the seat retainer 52 is positioned in the base channel 43 such that the seat lateral guide 54 is positioned adjacent to and in sliding contact with the base lateral guide 44 in the base channel 43 in a manner which defines a rotational center for the seat shell coinciding with rotational axis 100. The respective vertical bearing surfaces 424, 524 may also be in sliding contact dependent upon the rotational orientation of the seat shell 20. Small gaps between the lateral guides may exist within the defined sliding contact, but sufficient contact exists in the entirety of the interface to constrain the seat shell rotation to that generally about the rotational axis 100.

In the exemplar embodiment, two seat retainers 52 are provided and symmetrically positioned about the periphery of the seat connector interface, each spanning a seat retainer sector 57. A pair of seat gap sectors 59 is defined along the circular perimeter of the lateral bearing portion between the seat retainers 52. The arcuate measure of the seat gap sectors is preferably greater than the measure of the seat interface portions and the arcuate measure of the remaining seat retainers must be less than the arcuate measure of the base gap sectors so that the remaining portions of the seat retainers may pass through the base gap sectors when the respective retainers and gap sectors of the opposing interface portions are rotationally aligned, defined as a separation orientation.

The actual measure of base assembly and seat retainer sectors 47, 57 and base assembly and seat gap sectors 49, 59 may be varied provided that the measure of the gap sectors 49, 59 is greater than the measure of the retainer sectors 47, 57. The connector interfaces may also vary in the number of retainers and gap sectors provided the number of gap sectors equals or exceeds the number of retainers and the gap sectors are greater in measure than the retainer sectors. The symmetric pairs are preferred to permit two possible separation orientations of the seat shell for detachment from the base assembly corresponding to a side-facing orientation of the seat shell in either direction. Conversely, detachment or separation of the seat shell from the base assembly is not possible unless the seat shell is rotationally oriented to one of the separation orientations. The structure of the base assembly and seat retainers is sufficiently robust to withstand anticipated forces and maintain the seat shell connected to the base assembly during forward and rearward-facing orientations.

The seat connector assembly 30 is also configured with sufficient strength to maintain connection integrity of the safety seat 1 when subjected to vehicle crash loads. The generally circular configuration and the spatial configuration of the overlapping interface of the respective retainers and bearing surfaces preclude significant vertical displacement and limit relative motion between the seat shell and base assembly to rotational when the seat shell is engaged with the base assembly. The base and seat retainers may be structurally reinforced to withstand the forces created during vehicle crashes and retain the seat shell attached to the base assembly.

The seat connector assembly 30 may allow the seat shell oriented forward-facing or a rearward-facing when the seat shell is attached to the base assembly. The seat connector assembly 30 may also allow the seat shell to oriented in a side-facing orientation to facilitate placing or removing a child from the seat shell.

The seat connector assembly 30 may allow separation and/or detachment of the seat shell from the base assembly to, among other things, improve access to the vehicle laps belts or a dedicated LATCH connector belt when a user is installing the base assembly. Proper anchorage of the base assembly to the vehicle is essential for proper safety function and child occupant protection during vehicle crashes. Improved access to vehicle safety belt connections improves the ability of a user to achieve a proper installation.

In another aspect of the invention, the seat connector assembly 30 may include a latching mechanism 90 comprising a pair of moveable latch members 92 opposingly disposed in the seat connector 50 to preclude inadvertent separation of the seat shell 20 from the base assembly 10 when operably attached. Movement of the latch members 92 is coordinated for simultaneous releasing movement by a link member 94; simultaneous movement of the latch members inwardly toward a release position may be effected by selective user operation of a pull cable 99 or similar releasing actuator pivoting link member 94. Additional latch members may be provided in the latching mechanism for increased stability. In one embodiment, a third latch member is provided and oriented perpendicular to the first and second latch member. Movement of any additional latch members is coordinated so that all latch members provided are simultaneously retracted to allow selective separation of the seat connector assembly by operation of the latching mechanism. Separation of the seat connector assembly is not enabled without use action to move the latching mechanism and disengage the latch members 92 from the base assembly retention structures (base retainers 42).

The latch members 92 may also secure the seat shell rotationally to in either the forward- or rear-facing orientations. Locking recesses 46 may be provided in the base lateral guide 44 and sized to receive the latch members 92 when outwardly displaced. The locking recesses 46 are positioned along a transverse axis 103 so that the latch members are similarly aligned only when the seat shell 30 is in the either the forward- or rear-facing orientations. When so positioned, the latch members extend outwardly into the locking recesses 46 to prevent rotation of the seat shell 30 unless the latch release handles 38 are operated to withdraw the latch members.

In another aspect of the invention, inadvertent release of the latching mechanism 90 and thereby inadvertent separation of the seat shell 20 from the base assembly 10 is prevented by a two-step releasing procedure. The first step requires orienting the seat shell so that respective retainers and gaps in the connector assembly are aligned to permit separation of the connector assembly. The second step requires operation of an interlock mechanism.

Figure 7:
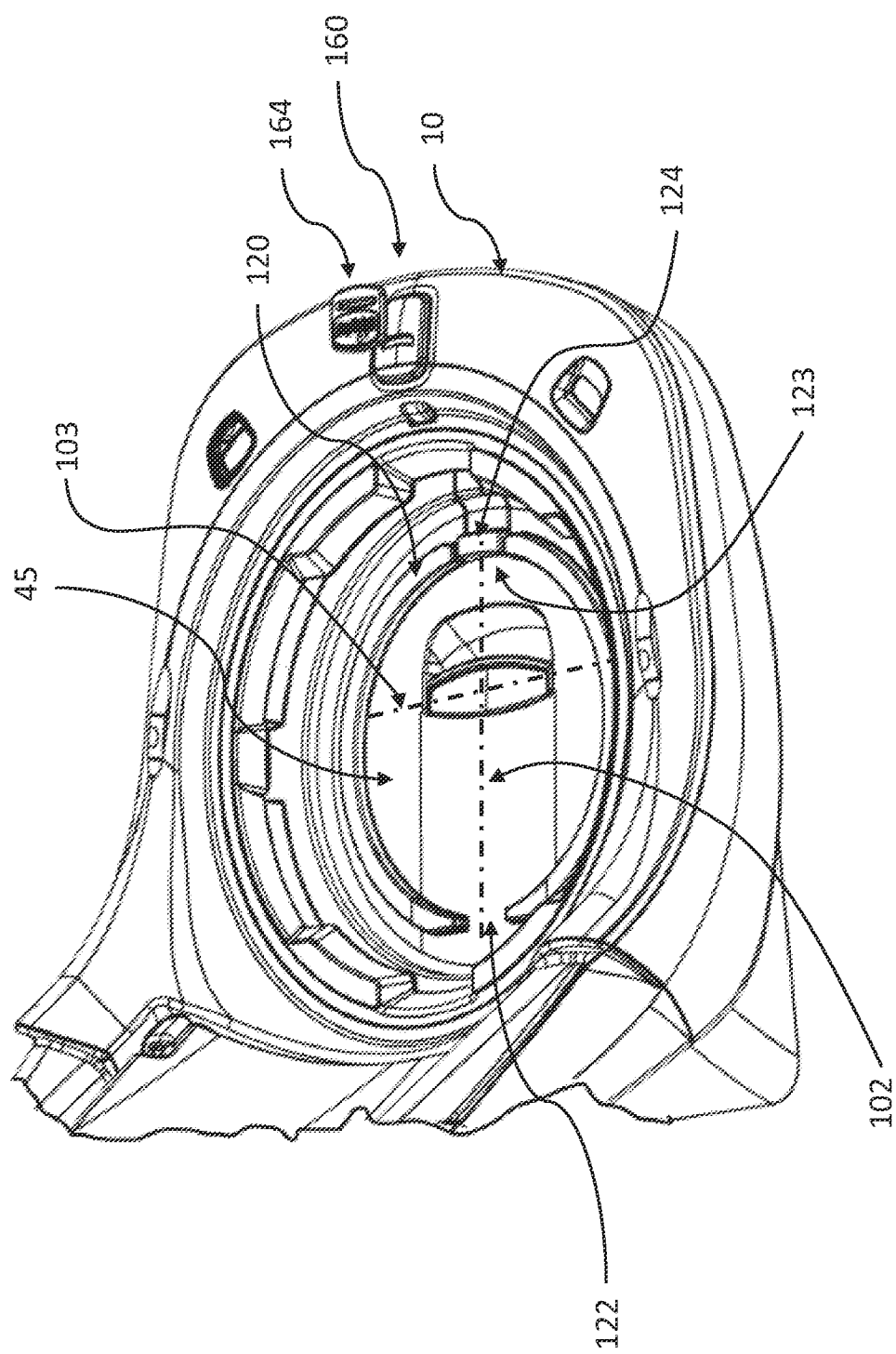
FIG. 7 is a partial perspective view of the base assembly detailing the blocking structure managing operation of the latching mechanism.
Figure 8:
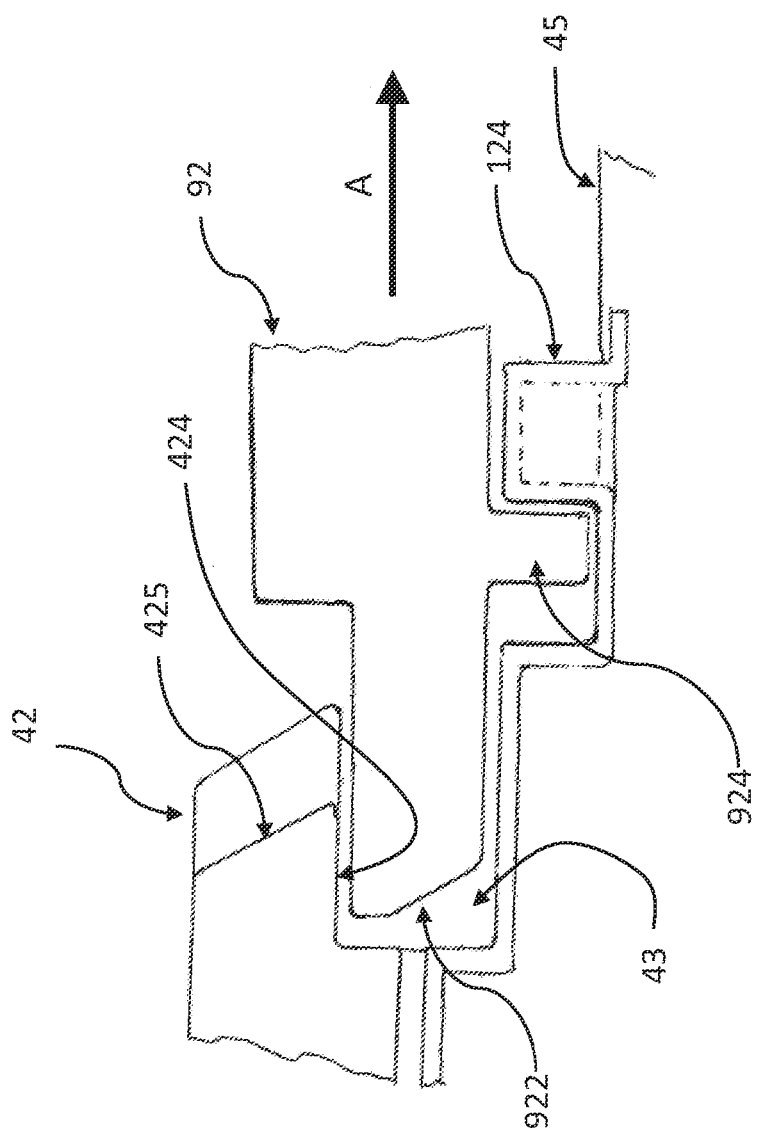
FIG. 8 is a partial view showing details of the blocking structure and latching mechanism in the blocking configuration.
Figure 9:
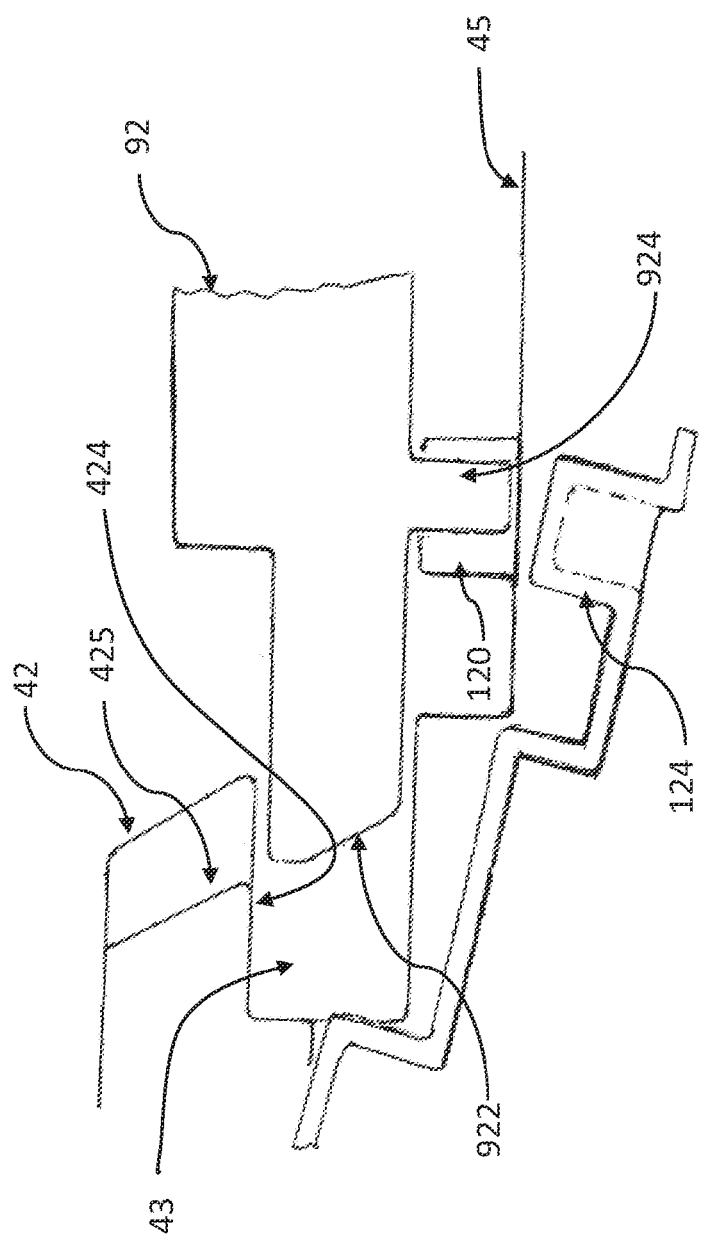
FIG. 9 is a partial view showing details of the blocking structure and latching mechanism in the unblocking or released configuration.

Referring to FIGS. 7 through 9, the base assembly may include a blocking structure 120 that projects upwardly from the floor surface 45 of the base assembly 10. The blocking structure 120 is circularly configured and disposed inwardly concentric to the wall structure of the base lateral bearing portion 44 and generally continuous excepting a pair of gaps 122, 123 positioned along a fore-aft axis 102 of the base assembly 10. The alignment of gaps 122, 123 coincides with the configuration of the retainers and gaps in the connector assembly so that movement of the latch members 92 is permitted only when the seat shell is positioned in the separation orientation (preferably one of the two side-facing alignments of the seat shell).

A primary interlock in the form of a movable blocking tab or latch interlock 124 is provided in the first or forward gap 123 allowing movement between positions blocking (FIG. 8) or unblocking (FIG. 9) the opening 123. The latch members 92 include a blocking extension 924 which is positioned radially outwardly and adjacent to the blocking structure when the seat shell 20 is attached to the base assembly 10. The latch interlock 124 prevents unlatching movement of the latch member 92 by blocking inward movement in the direction "A" (FIG. 8) when in the blocking position, just as the blocking structure 120 does when the seat shell is oriented other than in the separation orientation. When the latch interlock 124 is moved to the unblocking position, the blocking extension 924 may freely pass through the foremost opening 123 in the blocking structure 120 so that the latch member 92 may disengage the first retainer 42.

The fore-aft positioning of the openings 122, 123 coincides with the position of the latch members 92 when the seat shell 20 is oriented in either side-facing configuration. It also aligns the latch members with the guide structures 425 which have an inner circumference greater than that of the base retainer 42 to reduce the displacement of the latch members 92 necessary to disengage the seat shell. Because movement of the latch members is coordinated for simultaneous releasing movement by a link member 94, allows blocking the movement of either latch member to prevent inward (unlatching) movement blocks movement of both.

Figure 10:
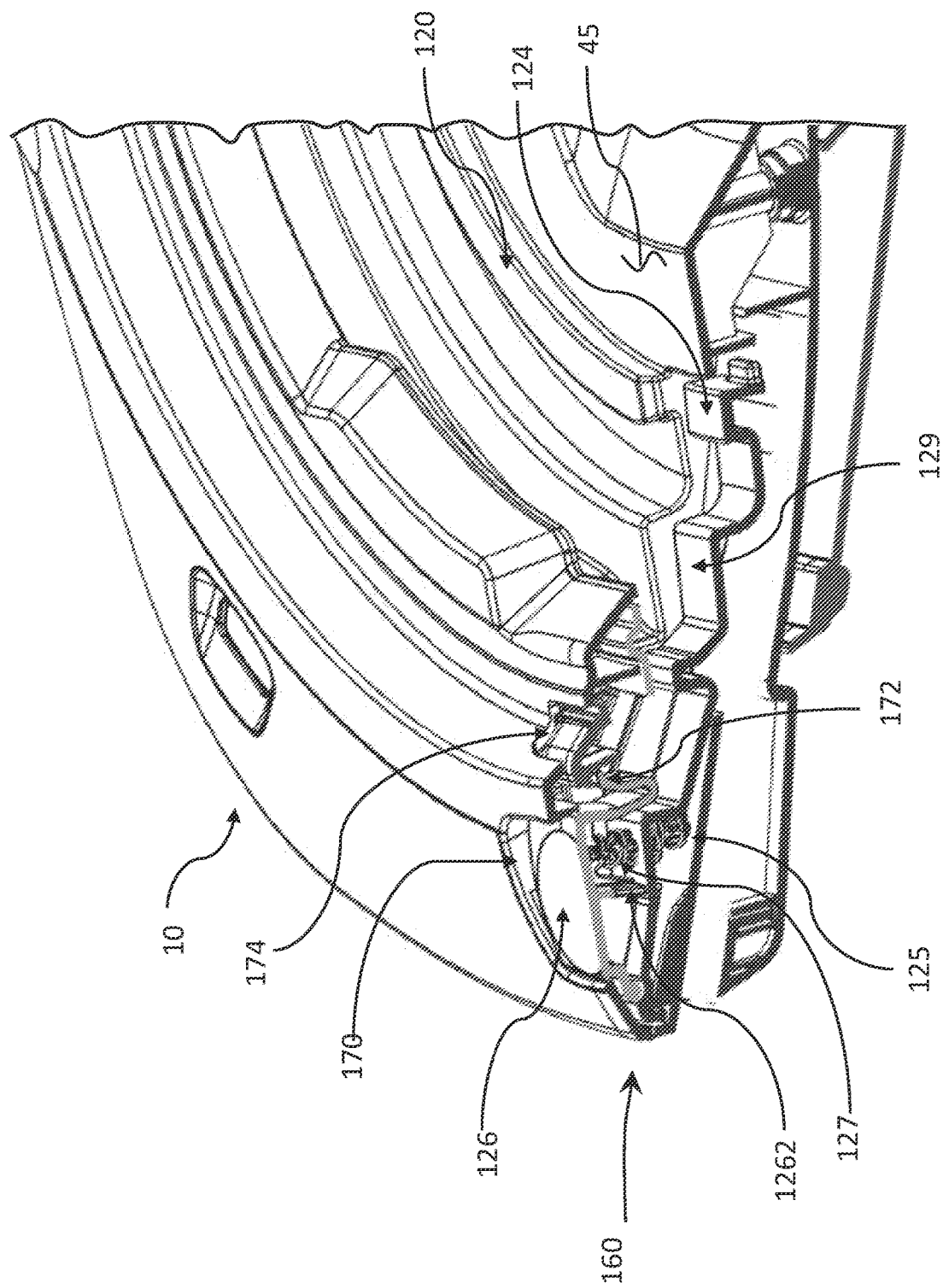
FIG. 10 is a partial section view of the base assembly showing the latching mechanism and a latch interlock mechanism.

The latch interlock 124 may be attached to the base assembly and include a resilient member 125 to bias the latch interlock in the blocking position. Movement of the latch interlock may be by user interface with an unlatching actuator 126 which allows a user to selectively reposition the latch interlock into the unblocking position. In the illustrated embodiment shown in FIG. 10, an opening 170 in the base 10 allows a user to depress unlatching actuator 126 and integral driver 1262 downward so that driver 1262 contacts and then moves the interlock member 129 supporting latch interlock 124 downwardly.

The latch interlock 124 may include a holding mechanism to momentarily retain the latch interlock in the unblocking position which the seat shell is being detached from the base assembly. The holding mechanism may be provided so a user is not required to hold the release actuator while also lifting the seat shell to detach it from the base assembly. The holding mechanism may include a catch or ratchet 172 to temporarily engage a portion of release actuator 126 thereby momentarily maintaining the latch interlock 124 in the unblocking position. The momentary holding of the release actuator is configured to release once the seat shell is reconnected to the base assembly. A trigger release 174 may be provided to interact with a portion of the seat shell as it is reinstalled to release the ratchet 172 and allow the actuator 126 and latch interlock 124 to return to the blocked position. An additional resilient member 127 may be disposed between the actuator 126 and the interlock member to permit differential movement therebetween enabling the interlock ratchet 172 to function.

Figure 11:
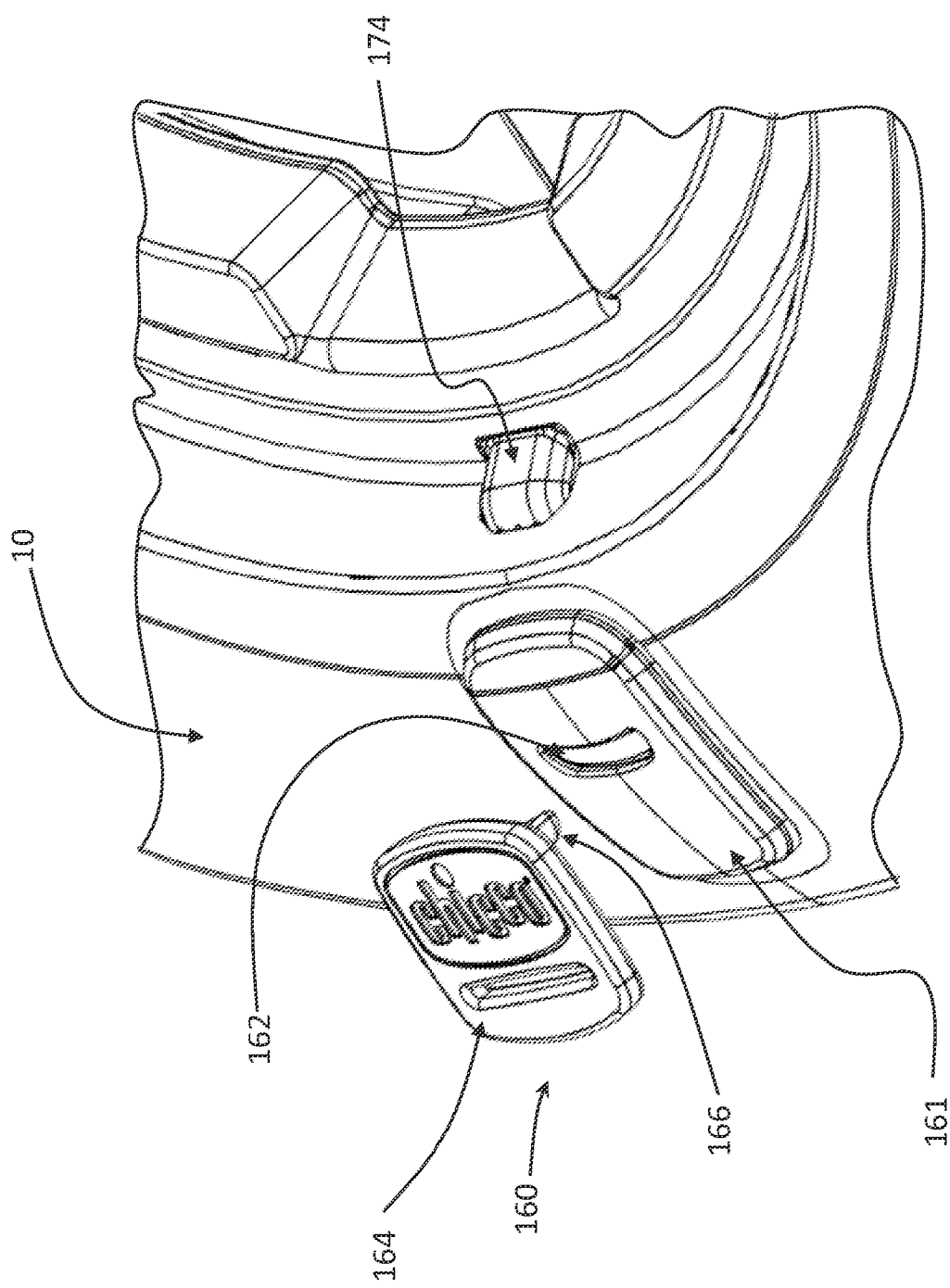
FIG. 11 is a partial view of the base assembly latching mechanism release and secondary interlock illustrating one embodiment of a secondary interlock for the release mechanism.
Figure 12:
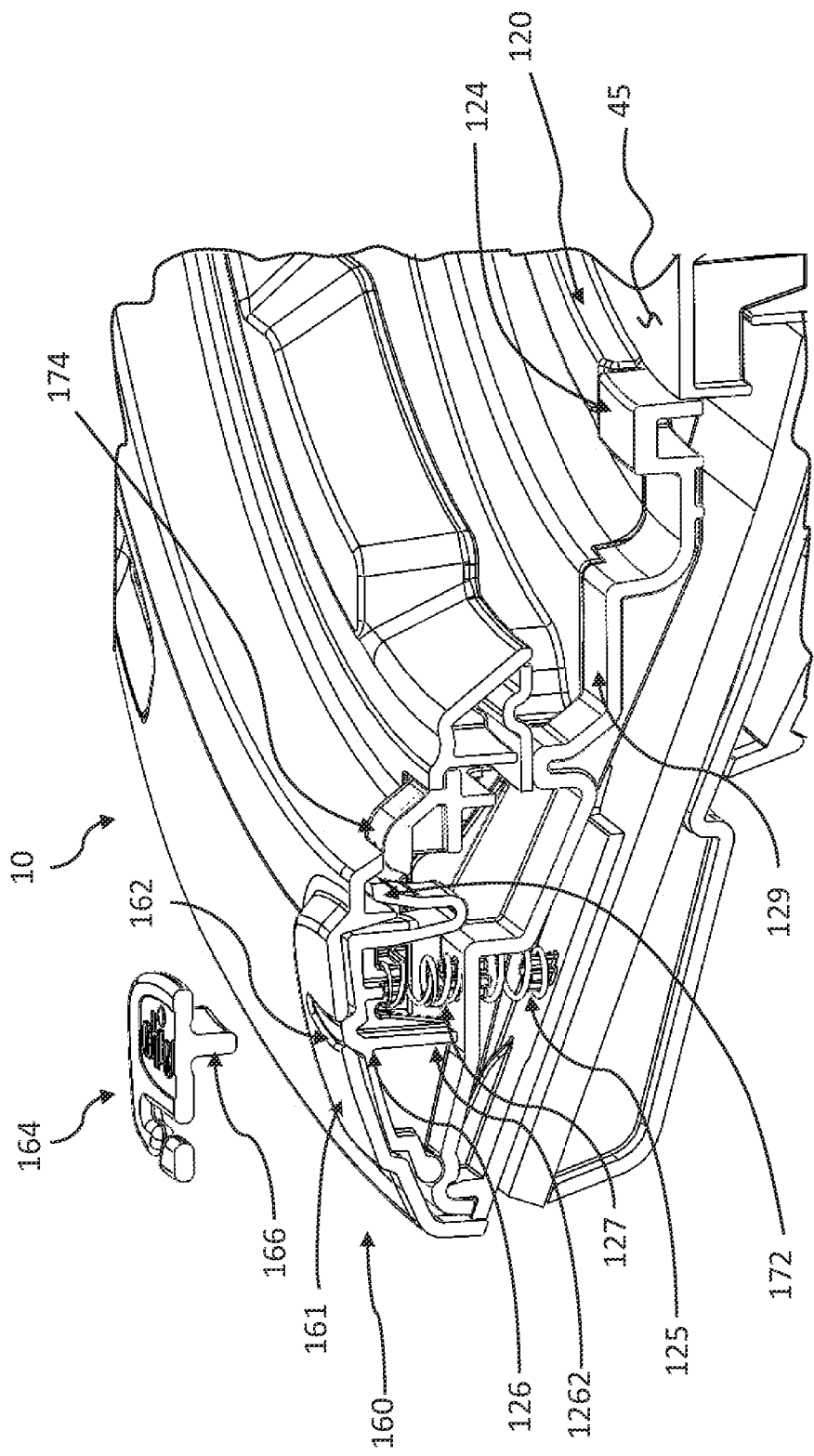
FIG. 12 is a partial section view of the base assembly latching and interlock mechanism shown in the blocking configuration.

In another aspect of the invention, the latching mechanism 90 includes a secondary interlock 160 to prevent unintended separation of the seat shell from the base. In this aspect, the unlatching actuator 126 is configured with an additional interlocking feature for selective actuation thereof. The additional interlocking feature may require the use of a key or tool 164 to operate the unlatching actuator 126. In one embodiment, the unlatching actuator 126 includes a geometry that prevents inadvertent actuation of the unlatching actuator. For example, the unlatching actuator 126 is arranged and disposed with a geometry that does not allow the depressing of the unlatching actuator by a finger or thumb through the opening 170. In one embodiment, as shown in FIGS. 7, 11 and 12, the opening 170 for accessing unlatching actuator 126 includes a cover portion 160 and an access aperture 162. In this embodiment, the cover portion 161 provides protection to the unlatching actuator 126 and permits external actuation of the unlatching actuator 126 only through access aperture 162. The cover portion 161 and access aperture 162 are arranged and disposed to permit passage of a key or tool 164, which, upon insertion actuates the unlatching actuator 126.

Figure 13:
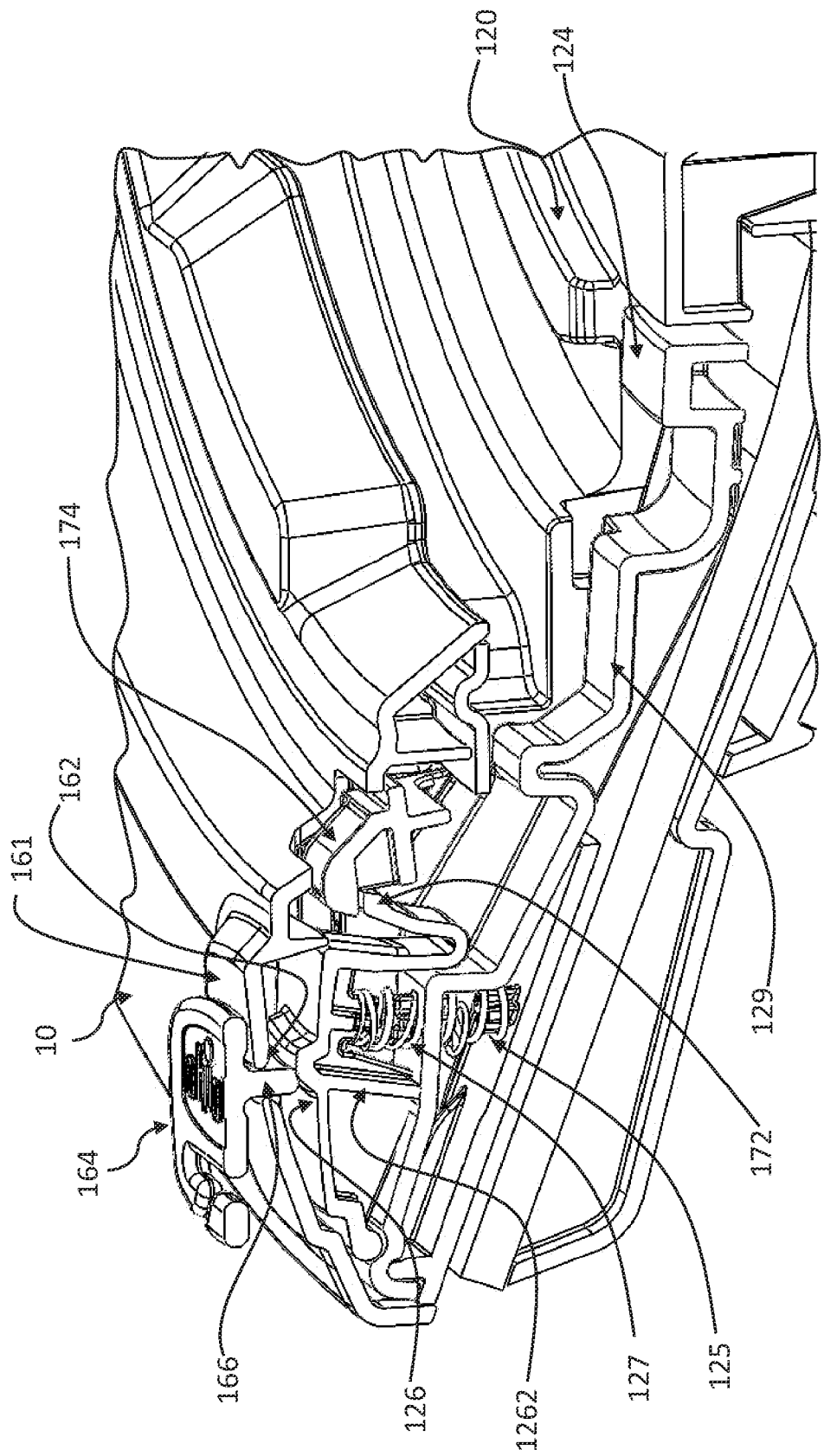
FIG. 13 is a partial section view of the base assembly latching and interlock mechanism shown in the unblocking or releasing configuration.

Tool 164 includes a protrusion 166 having a geometry that fits within or otherwise matches the cross-sectional geometry of access aperture 162. The geometry of protrusion 166 is not particularly limited, provided the geometry fits within or otherwise corresponds to the cross-sectional geometry of access aperture 162. For example, protrusion 166 may have a circular, oval, square, rectangular or other geometric shaped cross-sectional geometry to fit into the corresponding access aperture 162. FIG. 12 shows the unlatching actuator 126 in the unactuated (blocking) position with tool 164 positioned above the unlatching actuator 126. As shown in FIG. 13, tool 164 is utilized to actuate unlatching actuator 126 by insertion of tool 164 into the access aperture 162. Protrusion 166 contacts and depresses unlatching actuator 126 downward coinciding with pressing the tool downwardly, which in turn move blocking tab 124 downward and allows the latching members to move. As described above, the unlatching actuator 126 is moved downward and is operably connected to move blocking tab 124 to the unblocking position to permit separation of the seat shell 20 from the base assembly 10.

While the figures show the access aperture 162 as a crescent shape, the geometry is not so limited. The access aperture 162 may include any suitable geometry that permits passage of a tool or key. In another embodiment, the cover portion 161 and access aperture 162 are integrated into the unlatching actuator 126. In another embodiment, the unlatching actuator 126 may include a locking mechanism, such as a barrel lock, releasable by a key or tool. In this embodiment, the key or tool releases the lock which permitting movement/actuation of the unlatching actuator 126. In all embodiments, the secondary interlock 160 should not inhibit the self-resetting function of the unlatching actuator, but allow the latching interlock 124 to automatically return to the blocking position once the seat shell has been detached and/or reconnected to the base assembly.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The invention claimed is:

1. A child safety seat for a vehicle comprising:
a base assembly securable to a seat in a vehicle;
a seat shell separable from the base assembly;
a connector assembly connecting the seat shell to the base assembly and configured to enable selective detachment of the seat shell from the base assembly;
a latching mechanism configured to selectively release the connector assembly and thereby enable detachment of the seat shell from the base assembly; and
a latch interlock having blocked and unblocked positions and configured to prevent release of the latching mechanism when in the blocked position, the latch interlock including a releasing actuator operable to move the latch interlock from the blocked to the unblocked position; and
a secondary interlock apparatus configured to selectively inhibit operation of the releasing actuator thereby preventing movement of the latch interlock to the unblocked position and subsequent detachment of the seat shell from the base assembly, the secondary interlock apparatus comprises a shape that requires a tool to operate the releasing actuator.

2. The safety seat of claim 1, wherein the shape comprises an opening limiting access to the release actuator, the opening having a shape configured to accept the tool.

3. The safety seat of claim 2, wherein the opening has a cross-sectional shape and the tool has a protrusion having a cross-sectional shape matching the opening.

4. The safety seat of claim 1, wherein the latching mechanism includes a resilient member biasing the latching mechanism in the blocking position.

5. The safety seat of claim 4, wherein the latching mechanism further comprises a holding device configured to momentarily retain the latch interlock in the unblocked position as the seat shell is detached.

6. The safety seat of claim 5, wherein the holding device further comprises a release which releases the holding device when the seat shell is reconnected to the base assembly and enables the latching mechanism to return to the blocking position.

7. A two-part child safety seat for a vehicle comprising:
a base assembly securable to a seat in a vehicle;
a seat shell connected to the base assembly and selectively releaseable therefrom by operation of a latching assembly;
a latch interlock having blocked and unblocked positions and configured to prevent release of the seat shell from the base assembly when in the blocked position, the latch interlock further comprising a releasing actuator operable to move the latch interlock from the blocked to the unblocked position;
a holding device configured to momentarily retain the latch interlock in the unblocked position as the seat shell is released from the base assembly; and
a secondary interlock apparatus configured to selectively inhibit operation of the releasing actuator thereby preventing movement of the latch interlock to the unblocked position and subsequent release of the seat shell from the base assembly.

8. The child safety seat of claim 7, wherein the latching assembly is biased toward the blocked position.

9. The child safety seat of claim 7, wherein the holding device further comprises a release which releases the holding device when the seat shell is reconnected to the base assembly and returns the latching assembly to the blocking position.

10. The child safety seat of claim 7, wherein the secondary interlock apparatus comprises a shape that requires a tool to operate the releasing actuator.

11. The child safety seat of claim 10, wherein the shape comprises an opening limiting access to the releasing actuator, the opening having a shape configured to accept the tool.

12. The child safety seat of claim 11, wherein the opening has a cross-sectional shape and the tool has a protrusion having a cross-sectional shape matching the opening.

13. A latch interlock for a child safety seat, the seat having a base assembly, a seat shell connectable to the base assembly and selectively releasable by a latching assembly, the latch interlock comprising:
a primary latch interlock having blocked and unblocked positions, the primary interlock being resiliently biased toward the blocked position and preventing release of the seat shell from the base assembly positioned therein;
a releasing actuator operable to move the latch interlock from the blocked to the unblocked position;
a holding device configured to momentarily retain the primary latch interlock in the unblocked position as the seat shell is released from the base assembly; and
a secondary latch interlock apparatus configured to selectively inhibit operation of the releasing actuator thereby preventing movement of the primary latch interlock to the unblocked position and subsequent release of the seat shell from the base assembly.

14. The latch interlock of claim 13, wherein the releasing actuator is configured to move the primary latch interlock to the unblocked position when the releasing actuator is depressed.

15. The latch interlock of claim 14, wherein the secondary interlock apparatus comprises a cover portion and an access aperture that requires a tool to operate the releasing actuator.

16. The latch interlock of claim 15, wherein the cover portion and access aperture are arranged and disposed to permit passage of a tool, which, upon insertion moves the releasing actuator and thereby the primary latch interlock to the unblocked position.

17. The latch interlock of claim 16, wherein the cover portion and access aperture are integrated into the releasing actuator.

* * * * *